(12) United States Patent
Kim et al.

(10) Patent No.: US 8,496,514 B2
(45) Date of Patent: Jul. 30, 2013

(54) INTELLIGENT ENERGY SAVING VENTILATION CONTROL SYSTEM

(75) Inventors: Jo Chun Kim, Seoul (KR); Sang Gwi Chung, Seoul (KR); Youn Suk Son, Seoul (KR); Young Sunwoo, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 625 days.

(21) Appl. No.: 12/677,808

(22) PCT Filed: Sep. 19, 2008

(86) PCT No.: PCT/KR2008/005565
§ 371 (c)(1),
(2), (4) Date: Mar. 11, 2010

(87) PCT Pub. No.: WO2009/064074
PCT Pub. Date: May 22, 2009

(65) Prior Publication Data
US 2010/0285731 A1    Nov. 11, 2010

(30) Foreign Application Priority Data
Nov. 16, 2007  (KR) .................. 10-2007-0116973

(51) Int. Cl.
*F24F 13/14* (2006.01)
(52) U.S. Cl.
USPC .......................................... 454/337; 454/239
(58) Field of Classification Search
USPC .......................................... 454/239, 156, 158
See application file for complete search history.

(56) References Cited

U.S. PATENT DOCUMENTS

| | | | | | |
|---|---|---|---|---|---|
| 1,914,667 | A | * | 6/1933 | Kolla | 96/423 |
| 5,876,277 | A | * | 3/1999 | Uemura et al. | 454/139 |
| 5,954,577 | A | * | 9/1999 | Meckler | 454/75 |
| 6,913,637 | B2 | * | 7/2005 | Kim | 95/8 |
| 2007/0111665 | A1 | * | 5/2007 | Klein et al. | 455/63.2 |

FOREIGN PATENT DOCUMENTS

| JP | 04169323 A * | 6/1992 |
|---|---|---|
| JP | 06-277557 | 10/1994 |
| JP | 2000-117029 | 4/2000 |
| JP | 2002-054830 | 2/2002 |
| JP | 2005-241093 | 9/2005 |

OTHER PUBLICATIONS

International Search Report of International Application No. PCT/KR2008/005565 mailed Mar. 30, 2009.
English abstract of Publication No. JP 2000-117029A.
English abstract of Publication No. JP 2002-548307.
English abstract of Publication No. JP 2005-241093.
English abstract of Publication No. JP 2006-277557.

* cited by examiner

*Primary Examiner* — Steven B McAllister
*Assistant Examiner* — Brittany E Towns
(74) *Attorney, Agent, or Firm* — Rabin & Berdo, P.C.

(57) ABSTRACT

An intelligent energy saving ventilation control system capable of drastically reducing power consumption of the system. The system includes suction and exhaust ducts having a predetermined shape, a pre-filter disposed at an entry region of the suction duct, and a composite filter disposed behind the pre-filter. The system includes a fan motor disposed between the suction and exhaust ducts to linearly control an internal suction pressure in the suction duct; a turning angle motor for controlling a turning angle of the composite filter; an outdoor air sensor for measuring freshness of outdoor air, converting the measured result into an electrical signal, and outputting the signal; and a control unit for controlling operations of the turning angle motor and the fan motor in order to control an aperture angle of the composite filter and an internal pressure in the suction duct.

4 Claims, 5 Drawing Sheets

INTELLIGENT ENERGY SAVING
VENTILATION CONTROL SYSTEM

CROSS-REFERENCE TO RELATED
APPLICATIONS

The present application is a national stage application under 35 U.S.C. §371 of International Application No. PCT/KR08/05565 with an international filing date of Sep. 19, 2008, and claims priority to KR10-2007-0116973 filed Nov. 16, 2007.

BACKGROUND OF THE INVENTION

1. Field of the Invention

The present invention relates to a ventilation control system, and more particularly, to an intelligent energy saving ventilation control system which is configured to control a turning angle of a composite filter depending on the freshness of outdoor air, and thus, to control the power of a fan motor depending on a pressure of exhaust air varying by the turning angle.

2. Discussion of Background Information

As shown in FIGS. 1 and 2, a typical ventilation unit for use in buildings comprises first and second support frames 30, 32, which are removably mounted at a predetermined position in a housing 1. Additionally, the first and second support frames are hinged to each other so as to allow the internal surfaces thereof to be opened and closed. Further, a carbon filter 34 is removably disposed between the first and second support frames 30, 32 to filter extraneous substances suspended in air.

More specifically, the first and second support frames 30, 32 are constructed of rectangular aluminum bars having a constant thickness such that an opening is centrally defined by the rectangular aluminum bar to allow air to pass therethrough. The first and second frames 30, 32 are coupled to each other at the corresponding sides using a plurality of hinges. The plurality of hinges are vertically spaced apart at a predetermined interval, so that the first and second frames 30, 32 are swingably opened and closed within a predetermined angle range. The first support frame 30 is provided at the central opening with an electrostatic net 38 which functions to filter a portion of extraneous substances suspended in air passing through the opening, using electrostatic force, and to hold the carbon filter 34 disposed between the first and second support frames 30, 32 so as to prevent the carbon filter 34 from protruding from the support frame 30. The second support frame 32 is provided at the central opening with an aluminum support net 40 to hold the carbon filter 34 disposed between the first and second support frames 30, 32, thus preventing the protrusion of the carbon filter 34.

In this regard, the electrostatic net 38 has a mesh smaller than that of the support net 40. The first support frame 30 includes a catcher 42 on the opposite side to that which the plurality of hinges are mounted, so that the first and second support frames 30, 32, which turn about the hinges to open and close, can be maintained in the closed position and can be released from each other. The catcher 42 is configured to take a U-shaped section having a width corresponding to the total thickness of the closed first and second support frames 30, 32, so as to hold or release the closed first and second support frames. The catcher 42 includes an integral extension having a rivet hole which enables the catcher 42 to be hingedly connected to an external surface of the first rectangular support frame 30.

During operation of the conventional ventilation unit, wherein a blower 13 is operated and a carbon filter 34 is disposed between the first and second support frames 30, 32 in the housing 1, outdoor air is drawn into the housing 1 through an air inlet 1a communicating with a first duct 7a due to a wind pressure generated from the blower 13. Subsequently, the outdoor air, which was introduced into the housing 1, passes through the electrostatic net 38, the carbon filter 34 and the support net 40 in the order in which they are held by the first and second support frames 30, 32.

At this point, the electrostatic net 38 adsorbs and removes extraneous substances suspended in the air, using static electricity, and the carbon filter 34 filters the remaining extraneous substances in the air, which were not filtered through the electrostatic net 38, while permitting only pure air (purified air) to pass therethrough. The purified air, which passes through the carbon filter 34, is introduced into a second duct 7b, which communicates with an air outlet 1b of the housing 1 through the blower 13. The air flowing in the second duct 7b is discharged into an indoor space through an interior ceiling. As a result of this process, the indoor air quality is improved with respect to cleanliness.

In order to remove the carbon filter 34 from the housing 1, the first and second support frames 30, 32 are first taken out of the housing 1 through a door provided on the housing 1. Thereafter, when the catcher 42, which is hingedly connected to the first support frame 30, is pulled in a releasing direction, the catcher 42 is turned in the releasing direction about a rivet 44. The rivet's function is to connect the extension of the catcher 42 with the first support frame 30, such that the first and second support frames 30, 32 are released from the locked condition, and are allowed to open.

In this state, when the first and second support frames 30, 32 are pulled apart from each other, the first and second support frames 30, 32 are turned outwards about the plurality of hinges, which are fixed to the external surfaces of the first and second support frames 30, 32, while being separated from the carbon filter 34, so that the carbon filter 34 is released from the first and second support frames 30, 32.

As described above, the conventional ventilation unit is configured to allow easy attachment and detachment of the filter, which is a main component of the ventilation unit, resulting in a structure with improved ventilation efficiency. However, since the conventional ventilation unit is adapted to realize the air purification with the aid of the replacement filter, there is a problem in that power consumption is increased due to high drive load of the fan motor, if a cleaning period of the filter is extended. Furthermore, there is an additional problem in that, since cleaning the filter can require manual operation, labor power is inevitably expended.

SUMMARY OF THE INVENTION

Accordingly, the present invention resolves the above problems occurring in the related art, and an object of the present invention is to provide an intelligent energy saving ventilation control system. Such a system is configured to control a turning angle of a filter to decrease a pressure of exhaust air, depending on a freshness of outdoor air, thereby reducing a power consumption.

Another object of the present invention is to provide an intelligent energy saving ventilation control system in which a replacement cycle of a filter is extended for the service life of the system, thereby reducing the cost for unit maintenance.

In order to accomplish the above objects, the present invention provides an intelligent energy saving ventilation control system including suction and exhaust ducts having a predetermined shape, a pre-filter disposed at an entry region of the suction duct, and a composite filter disposed behind the pre-filter. The ventilation control system includes the following: a fan motor disposed between the suction and exhaust ducts to linearly control an internal suction pressure in the suction duct in response to an external control signal; a turning angle motor for controlling a turning angle of the composite filter; an outdoor air sensor for measuring freshness of outdoor air, converting the measured result into an electrical signal, and outputting the signal; and a control unit for controlling operations of the turning angle motor and the fan motor, in order to control an aperture angle of the composite filter and an internal pressure in the suction duct in response to the output signal from the outdoor air sensor.

Specifically, the control unit includes: drivers for respectively supplying rated signals to realize turning angles and rotational speeds of the at least one turning angle motor and the fan motor; motor condition sensors mounted on the turning angle motor and the fan motor to detect turning angles and rotational speeds of the at least one turning angle motor and the fan motor; an interface for converting signals detected by the motor condition sensors and the outdoor air sensor into shaped signals; a program memory for storing information about whether or not outdoor air is introduced and information about numerical information about an introduction amount of outdoor air, based on freshness of the outdoor air detected by the outdoor air sensor; for storing table information which is plotted to determine a turning angle of the at least one turning angle motor and the number of rotation of the fan motor based on the introduction amount of the outdoor air; and a control unit for supplying motor control signals to the drivers, in which the motor control signals are determined by the table information plotted based on the results detected by the outdoor air sensor and the motor condition results of the at least one turning angle motor and the fan motor.

The present invention has an advantage in that a discharge load of the fan motor is drastically reduced through filtering effects of the stationary pre-filter and the composite filter which varies in a turning angle depending on the freshness of the outdoor air, thus reducing power consumption of the fan motor. Furthermore, the present invention has another advantage in that the service life of the composite filter can be extended by control of turning angle of the composite filter, and it is possible to reduce manpower and operational expenses which are excessive during system management.

BRIEF DESCRIPTION OF THE DRAWINGS

These and other features, aspects and advantages of the present invention will become better understood with regard to the following description, appended claims, and accompanying drawings, where:

DETAILED DESCRIPTION OF EMBODIMENTS

The structure and operation of preferred embodiments of the present invention will be described in detail below with reference to accompanying drawings.

Figure 1:
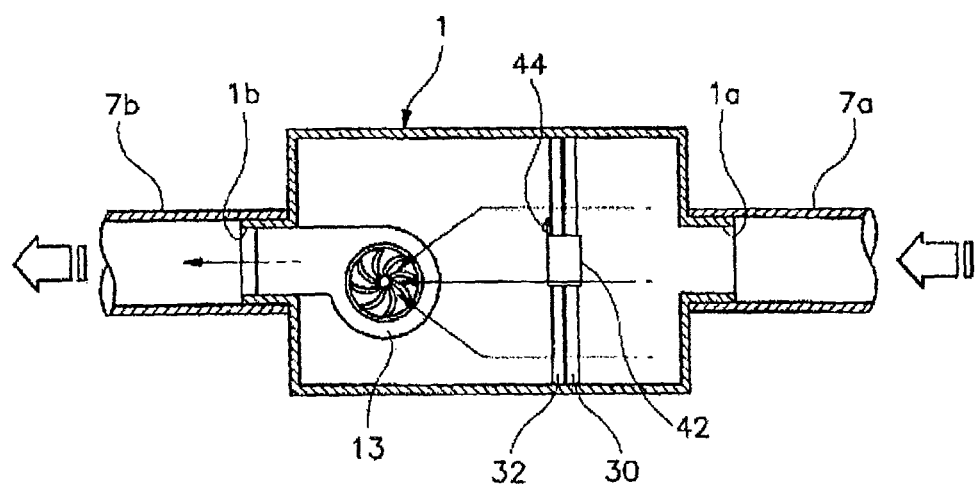
FIGS. 1 and 2 are views showing a structure of a conventional ventilation unit.
Figure 2:
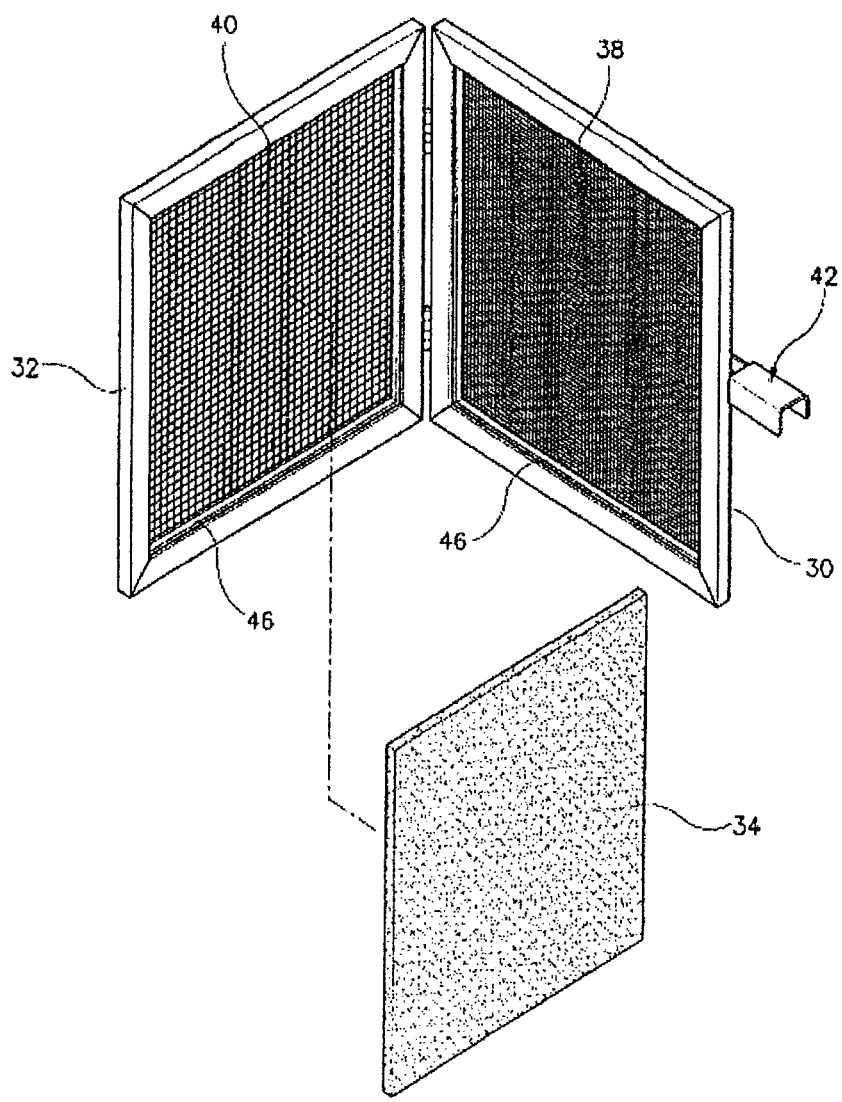
Figure 3:
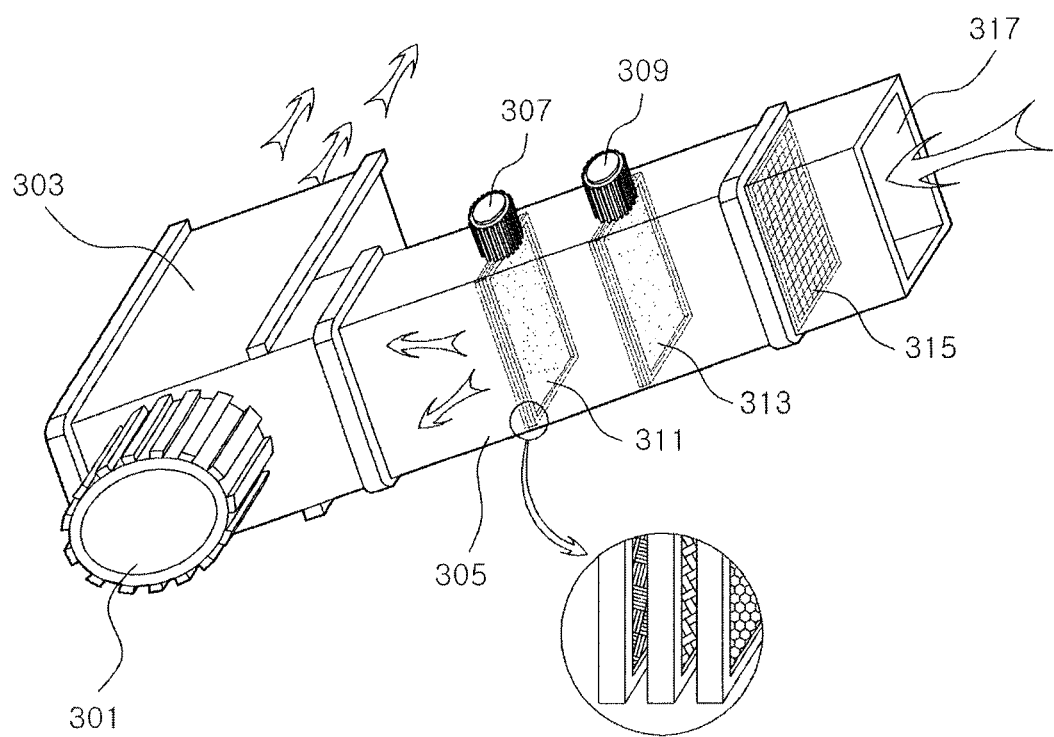
FIG. 3 is a perspective view showing an intelligent ventilation control system according to the present invention.

FIG. 3 is a perspective view showing a ventilation control system according to the present invention. As shown in the drawing, the ventilation control system, which is constructed to filter outdoor air and to discharge the filtered air into an interior space, includes a pre-filter disposed in an introduction region of a suction port and at least one composite filter is disposed behind the pre-filter. In order to control a turning angle of the above-mentioned composite filter and a discharge pressure of filtered air, the present invention comprises a suction duct 305 and an exhaust duct 303 which have predetermined shapes, a fan motor 301 disposed between the suction duct 305 and the exhaust duct 303 to linearly control a internal suction pressure in the suction duct 305 in response to external control signals, a turning angle motor 309 for controlling a turning angle of the composite filter 313, and a control unit for controlling operations of the fan motor 301 and the turning angle motor 309, which will be described later.

The control unit is adapted to control a turning speed of the fan motor 301 or a turning angle of the turning angle motor 309 in response to switching signals received from an administrator. It should be noted that an algorithm of a system operation of the control unit is based on a manual mode. However, the present invention may also be configured to conduct a ventilation control in an automatic mode as well as in the manual mode.

Accordingly, the control unit is associated with an outdoor air sensor to measure a cleanness of outdoor air, and is capable of controlling operations of the fan motor 301 and the turning angle motor 309 based on a signal detected by the outdoor air sensor.

The turning angle motor 309 can include any one of a DC motor, an AC motor and a stepping motor. If the turning angle motor 309 is a DC motor or an AC motor, the motor can include an additional inverter or converter, a reduction gear for providing a predetermined reduction ratio, and a positioning sensor or a photocoupler for recognizing a turning angle by an end of a shaft of the reduction gear.

As shown in the drawing, the turning angle motor 309 can include a first turning angle motor 309 and a second turning angle motor 307. Accordingly, the present invention can include a first composite filter 313 operated by the first turning angle motor 309 and a second composite filter 311 operated by the second turning angle motor 307. It should be noted that the ventilation control system according to the present invention can include a plurality of composite filters and can control respective turning angles of the composite filters, depending on the number of mounted components and a filtering capacity.

The composite filter, which is intended to trap various kinds of fine dust and gaseous contaminated material, for example, VOC, $NO_2$, ozone, etc., is composed of a plurality of subfilters stacked one on another. The composite filter proposed by the present invention is composed of various subfilters which are respectively suitable for various kinds of contaminated materials or various sizes of fine dust particles. It should be understood that structural modifications of the composite filter, which are adapted to regional conditions or historical conditions, fall within the technical scope of the present invention.

Figure 4:
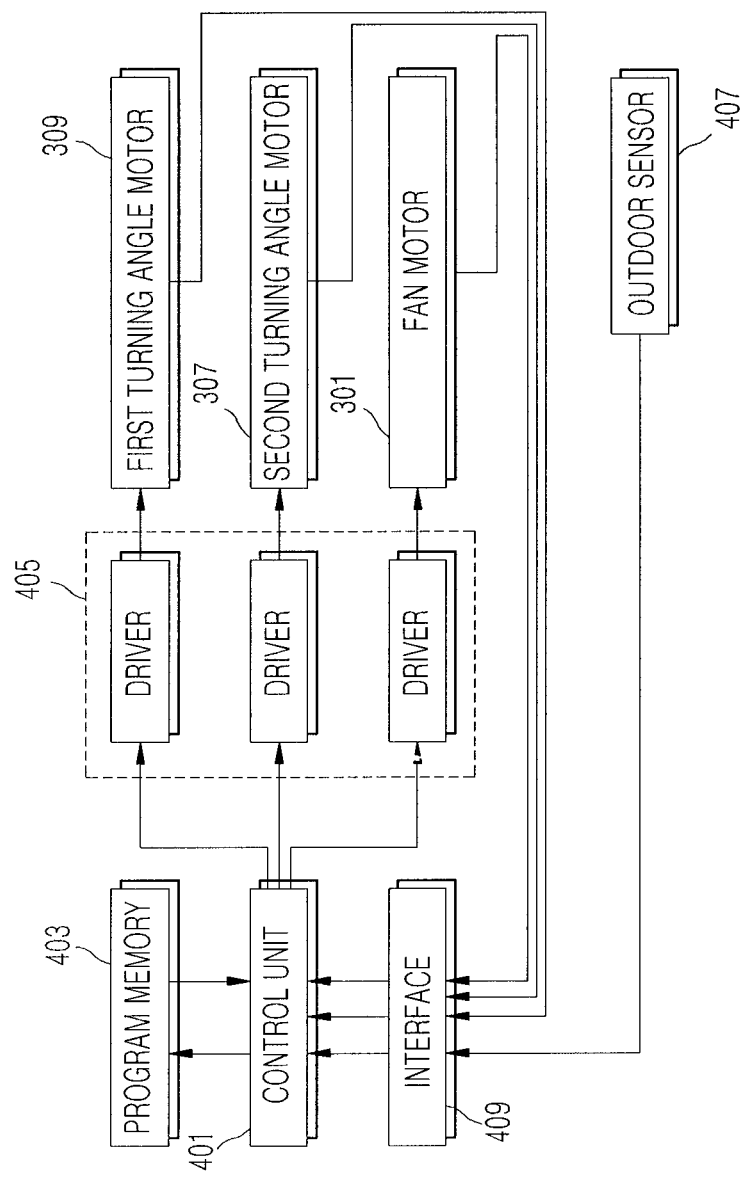
FIG. 4 is a block diagram showing substantial functions of the intelligent ventilation control system shown in FIG. 3.

FIG. 4 is a view showing substantial components of the ventilation control system according to the present invention. As shown in the drawing, the ventilation control system comprises drivers 405 for supplying rating signals for realizing predetermined turning angles and turning speeds of the fan motor 301 as well as the first turning angle motor 309 and the second turning angle motor 307, an outdoor air sensor 407 for extract freshness of outdoor air in a predetermined detecting pattern and converting the freshness into an electrical signal, motor condition sensors (not shown) mounted on the turning angle motor 307 and the fan motor 301, respectively, to detect turning angles and turning speeds of the motors, an interface for converting signals detected by the motor condition sensor and the outdoor air sensor 407 into shaped signals, a program memory 403 for storing information about whether or not outdoor air is introduced and information about numerical information about an introduction amount of outdoor air, based on freshness of the outdoor air detected by the outdoor air sensor 407, and for storing table information which is plotted to determine a turning angle of the at least one turning angle motor and the number of rotation of the fan motor 301 based on the introduction amount of the outdoor air, and a control unit 401 for supplying motor control signals to the driver 405, in which the motor control signals are determined by the table information plotted based on the results detected by the outdoor air sensor 407 and the motor condition results of the at least one turning angle motor and the fan motor 301.

In this regard, the control unit 401 is used to reduce power consumption of the fan motor 301, and is intended to prevent a suction load caused by the respective composite filters operated by the turning angle motors 307, 309. At this point, since the respective composite filters, i.e., the first composite filter 313 and the second composite filter 311, have mesh structures suitable for trapping fine particles having a particle size of 5 μm or more, a drive load of the fan motor 301 is related to a power consumption. Accordingly, the control unit 401 controls turning angles of the composite filters using the turning angle motors in order to decrease a drive load of the fan motor 301 in response to freshness of outdoor air.

To this end, it is preferable that the control unit 401 controls the at least one turning angle motor, respectively. For example, only the second composite 311 may be used by opening of the first composite filter 313, or a pressure load of incoming air may be reduced by partial opening of the first composite filter 313. In accordance with this principle, the control unit 401 controls a rotational speed of the fan motor 301 to be inversely proportional to an aperture angle of the turning angle motor.

The outdoor air sensor 407 is intended to measure a degree of pollution of outdoor air, for example, a degree of pollution caused by fine dust, a degree of pollution caused by carbon dioxide, a degree of pollution caused by volatile organic compound and the like. Accordingly, the program memory 403 stores reference value information relating to the degrees of pollution, and control information for determining opening and closing of the composite filters and aperture angles of the composite filters based on differences between the reference value information and measured value information. For example, the program memory 403 may set 150 μg/m$^3$ as a reference value for an average degree of pollution caused by fine dust, 1000 ppm as a reference value for a degree of pollution caused by carbon dioxide, and 500 m/m$^3$ as a reference value for a degree of pollution caused by volatile organic compounds.

In this regard, since the volatile organic compound is composed of various kinds of materials mixed with each other, the outdoor air sensor 407 cannot determine whether or not all of the various kinds of materials exceed the respective reference values. Therefore, it will be possible to measure freshness of outdoor air based on a degree of hazard of specified harmful materials such as benzene, toluene, formaldehyde and floating bacteria.

An operation of the present invention will now be described.

First, the control unit 401 instructs the motor condition sensor to measure turning angles of the first turning angle motor 309 and the second turning angle motor 307. This operation is conducted in order to determine whether the first composite filter 313 and the second composite filter 311 are set to be at the respective initial angles. The respective composite filters are oriented to be parallel to the pre-filter 315.

Furthermore, the control unit 401 instructs the outdoor air sensor 407 to measure freshness of outdoor air, and receives the measured result through the interface 409. As previously described, the freshness of outdoor air is measured by determining whether a degree of pollution caused by fine dust, a degree of pollution caused by carbon dioxide, a degree of pollution caused by volatile organic compound, and the like, are below the respective reference values. Although the outdoor sensor 407 may be composed of a plurality of sensors which are capable of measuring degrees of pollution caused by the respective harmful materials, it is composed of a single sensor for measuring a degree of pollution caused by one kind of material in some instances.

The control unit 401 patches the table information stored in the program memory 403 in order to determine whether the degrees of pollution measured by the outdoor air sensor 407 exceed the respective reference values. The table information includes reference information for the respective degrees of pollution, and the control unit 401 compares the degree of pollution measured by the outdoor air sensor 407 with the reference information, and thus, determines whether or not outdoor air is introduced into a room interior based on the compared result.

Figure 5:
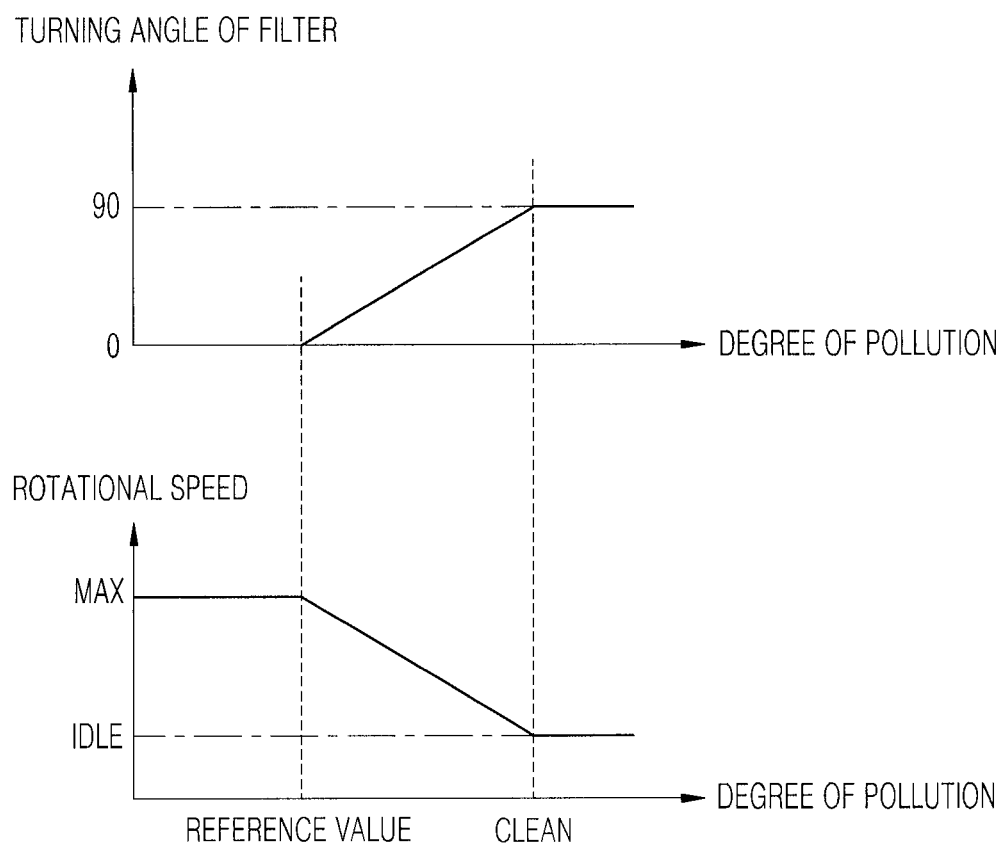
FIG. 5 is a view showing graphs that explain control patterns of a control unit according to the present invention.

More specifically, as shown in FIG. 5, when a degree of pollution of air exceeds the reference value, this case corresponds to a range below the reference value in the drawing. At this point, the control unit 401 instructs the first turning angle motor 309 and the second turning angle motor 307 to maintain turning angles of the first composite filter 313 and the second composite filter 311 at a degree of zero. Consequently, this signifies that both of the composite filters are closed to thus filter outdoor air through the composite filters.

At this time, the control unit 401 commands the fan motor 301 to rotate, and the driver 405 provides the fan motor 301 with rated current to cause the fan motor 301 to operate at the maximum speed, in response to the command from the control unit 401.

Meanwhile, when the signals, detected by the outdoor air sensor 407 and sent to the control unit 401, are representative of values below the reference values, that is, when a degree of pollution caused by fine dust is 150 μg/m$^3$ or less, a degree of pollution caused by carbon dioxide is 1000 ppm or less and a degree of pollution caused by volatile organic compound is 500 μg/m$^3$ or less, the control unit 401 instructs the composite filters to increase an aperture angle thereof and the fan motor 301 to decrease a rotational speed thereof. In this regard, the maximum aperture angle of the composite filters is 90 degrees, and the minimum speed of the fan motor 301 corresponds to the idling state. The fan motor 301 may fall within the scope of the present invention even if it is in the stopped state.

In this embodiment, the aperture angle of the composite filter is previously set in the program memory 403. However, if there are two or more composite filters, the sum of the aperture angles of the respective composite filters may be adopted as the preset aperture angle. More specifically, when the aperture angle of the composite filter, which is previously set in the program memory 403, is 30 degrees, the first composite filter 313 is opened by an angle of 30 degrees while the second composite filter 311 is not opened at all, or the first composite filter 313 is opened by an angle of 15 degrees while the second composite filter 311 is opened by an angle of 15 degrees.

In the present invention, the configuration in which the aperture angle of the composite filter is inversely proportional to the rotational speed of the fan motor 301 is to decrease the rotational speed of the fan motor 301 to compensate for the increased suction load caused by the opening of the composite filter. Accordingly, the aperture angle of the composite filter and the rotational speed of the fan motor, which are inversely proportion to each other, may properly vary, depending on a mesh structure of the composite filter, a size of the suction duct of the ventilation system, a capacity of the fan motor and the like.

As described above, it is believed that the intelligent energy saving ventilation control system according to the present invention has great industrial utility in that it achieves an improvement of practical utility of air purification, a reduction of electricity consumption for driving the ventilation control system and an improvement of efficiency of the operating system.

The following is a list of components shown in the figures with their respective reference numbers:
- 301: fan motor
- 307: second turning angle motor
- 309: first tuning angle motor
- 311: second composite filter
- 313: first composite filter
- 401: control unit
- 403: program memory
- 405: driver
- 407: outdoor sensor
- 409: interface

The invention claimed is:

1. A ventilation control system, comprising:
   suction and exhaust ducts having predetermined shape;
   a pre-filter disposed at an entry region of an inside of the suction duct;
   a first composite filter disposed next to the pre-filter and rotatably fixed at the inside of the suction duct;
   a second composite filter disposed next to the first composite filter and rotatably fixed at the inside of the suction duct;
   a fan motor disposed between the suction and exhaust ducts to linearly control an internal suction pressure in the suction duct in response to an external control signal;
   a first turning angle motor coupled to the first composite filter and controlling a turning angle of the first composite filter;
   a second turning angle motor coupled to the second composite filter and controlling a turning angle of the second composite filter;
   an outdoor air sensor for measuring freshness of outdoor air, converting the measured result into an electrical signal, and outputting the electrical signal; and
   a control unit for controlling the first and second turning angle motors and the fan motor, in order to control turning angles of the first and second composite filters and an internal pressure in the suction duct,
   wherein the control unit controls a rotational speed of the fan motor in inverse proportion to a sum of the turning angles of the first and second turning angle motors.

2. The ventilation control system according to claim 1, wherein the control unit comprises:
   drivers for respectively supplying signals to control the turning angles and the rotational speed of the first and second turning angle motors and the fan motor, respectively;
   motor condition sensors mounted on the first and second turning angle motors and the fan motor, to detect the turning angles and the rotational speed of the first and second turning angle motors and the fan motor, respectively;
   an interface for converting signals from the motor condition sensors and the outdoor air sensor into signals in a predetermined format; and
   a program memory for storing information about whether or not the outdoor air is being introduced into the suction duct, information about an amount of the outdoor air being introduced into the suction duct, information about the freshness of the outdoor air detected by the outdoor air sensor, and information about the turning angles of the first and second turning angle motors and the rotational speed of the fan motor.

3. The ventilation control system according to claim 2, wherein the outdoor air sensor detects one or more of a degree of pollution caused by fine dust, a degree of pollution caused by carbon dioxide, and a degree of pollution caused by volatile organic compound.

4. The ventilation control system according to claim 1, wherein the pre-filter, the first composite filter and the second composite filter are disposed such that the outdoor air passes through the pre-filter, then the first composite filter and then the second composite filter, and the pre-filter is non-rotatably fixed at the inside of the suction duct.

* * * * *